(12) United States Patent
Yoo et al.

(10) Patent No.: US 12,725,548 B2
(45) Date of Patent: Sep. 1, 2026

(54) DISPLAY DEVICE FOR VEHICLE, METHOD OF DRIVING THE SAME, AND ELECTRONIC DEVICE

(71) Applicant: Samsung Display Co., LTD., Yongin-si (KR)

(72) Inventors: Gi Na Yoo, Yongin-si (KR); Hyo Min Kim, Yongin-si (KR); Ji Young Kim, Yongin-si (KR)

(73) Assignee: Samsung Display Co., Ltd, Yongin-si (KR)

( * ) Notice: Subject to any disclaimer, the term of this patent is extended or adjusted under 35 U.S.C. 154(b) by 0 days.

(21) Appl. No.: 19/030,308

(22) Filed: Jan. 17, 2025

(65) Prior Publication Data

US 2026/0045189 A1 Feb. 12, 2026

(30) Foreign Application Priority Data

Aug. 8, 2024 (KR) ........................ 10-2024-0106154

(51) Int. Cl.
*G09G 3/20* (2006.01)
*G06F 3/01* (2006.01)

(52) U.S. Cl.
CPC ............... *G09G 3/20* (2013.01); *G06F 3/013* (2013.01); *G09G 2300/0452* (2013.01); *G09G 2320/0626* (2013.01); *G09G 2354/00* (2013.01); *G09G 2380/10* (2013.01)

(58) Field of Classification Search
CPC ............. G09G 3/20; G09G 2300/0452; G09G 2320/0626; G09G 2354/00; G09G 2380/10; G06F 3/013
See application file for complete search history.

(56) References Cited

U.S. PATENT DOCUMENTS 9,858,859 B2 1/2018 Her et al.
2008/0111833 A1* 5/2008 Thorn .................. G06F 1/3231 345/690
2013/0335646 A1* 12/2013 Liao ...................... G02B 30/25 349/15
2015/0054966 A1* 2/2015 Wang .................... H04N 25/68 348/187

(Continued)

FOREIGN PATENT DOCUMENTS

CN 117794314 A * 3/2024
CN 116628743 B * 4/2024 ......... G06F 21/6245

(Continued)

*Primary Examiner* — Benjamin C Lee

(74) *Attorney, Agent, or Firm* — Womble Bond Dickinson (US) LLP

(57) ABSTRACT

A display device for vehicle includes: a display panel including a display area including a first pixel and a second pixel, wherein the first pixel and the second pixel include light blocking layers differently arranged around a light-emitting units; and a display panel driver configured to drive the display panel, wherein the display panel driver is configured to determine line of sight angles between each of blocks of the display area and a line of sight of a driver based on driver information, and to determine a light emission ratio of the first pixel in each of the blocks and a light emission ratio of the second pixel in each of the blocks based on the line of sight angles for the blocks.

20 Claims, 9 Drawing Sheets

(56) References Cited

U.S. PATENT DOCUMENTS

| | | | | |
|---|---|---|---|---|
| 2015/0286103 | A1* | 10/2015 | Sato | H10K 59/122<br>349/86 |
| 2016/0154278 | A1* | 6/2016 | Kang | G02F 1/133788<br>445/6 |
| 2016/0196748 | A1* | 7/2016 | Yellambalase | G08G 1/166<br>340/435 |
| 2016/0266778 | A1* | 9/2016 | Rawlinson | B60K 35/60 |
| 2017/0010677 | A1* | 1/2017 | Roh | G06F 3/1454 |
| 2018/0151780 | A1* | 5/2018 | Jang | H10H 20/814 |
| 2018/0197922 | A1* | 7/2018 | Song | H10K 59/8792 |
| 2018/0198981 | A1* | 7/2018 | Li | H04N 7/181 |
| 2018/0270475 | A1* | 9/2018 | Gao | H04N 13/315 |
| 2019/0035839 | A1* | 1/2019 | Byun | H10F 39/8027 |
| 2019/0056625 | A1* | 2/2019 | Li | G02F 1/133516 |
| 2019/0333970 | A1* | 10/2019 | Lee | H10K 59/353 |
| 2021/0049340 | A1* | 2/2021 | Lee | G02B 3/0062 |
| 2021/0141492 | A1* | 5/2021 | Lee | G06F 3/0445 |
| 2021/0249486 | A1* | 8/2021 | Lee | H10K 59/8792 |
| 2021/0286222 | A1* | 9/2021 | Chen | G02F 1/136209 |
| 2022/0343824 | A1* | 10/2022 | Kim | G09G 3/2007 |
| 2022/0352131 | A1* | 11/2022 | Choi | H10H 20/8514 |
| 2022/0377223 | A1* | 11/2022 | Noble | G02B 27/0093 |
| 2022/0406851 | A1* | 12/2022 | Lee | H10K 59/873 |
| 2023/0168755 | A1* | 6/2023 | Lee | H10K 59/88<br>345/174 |
| 2023/0206877 | A1* | 6/2023 | Lee | G09G 5/003<br>345/204 |
| 2023/0230521 | A1 | 7/2023 | Wu et al. | |
| 2023/0316982 | A1 | 10/2023 | Jeong | |
| 2023/0320169 | A1 | 10/2023 | Song et al. | |
| 2023/0361130 | A1* | 11/2023 | Yang | G02F 1/136209 |
| 2024/0127760 | A1* | 4/2024 | Cho | B60K 35/60 |
| 2024/0357876 | A1* | 10/2024 | Li | H10K 59/126 |
| 2025/0261549 | A1* | 8/2025 | Gil | H10K 59/873 |

FOREIGN PATENT DOCUMENTS

| | | | | | |
|---|---|---|---|---|---|
| CN | 118101906 | A | * | 5/2024 | H04N 9/317 |
| JP | 2002340570 | A | * | 11/2002 | |
| JP | 2003137005 | A | * | 5/2003 | |
| JP | 2004117752 | A | * | 8/2004 | |
| JP | 2020118965 | A | * | 8/2020 | G02F 1/1323 |
| KR | 20160081084 | A | * | 7/2016 | G06F 3/017 |
| KR | 101809924 | B1 | * | 12/2017 | B60K 35/00 |
| KR | 10-2287826 | B1 | | 8/2021 | |
| KR | 10-2022-0043832 | A | | 4/2022 | |
| KR | 10-2023-0091375 | A | | 6/2023 | |
| KR | 10-2023-0134025 | A | | 9/2023 | |
| KR | 10-2023-0143228 | A | | 10/2023 | |
| KR | 10-2024-0050648 | A | | 4/2024 | |
| WO | WO-2020168904 | A1 | * | 8/2020 | H10K 59/8791 |

* cited by examiner

| BB | AG (°) |
|---|---|
| BB1 | 10 |
| BB2 | 20 |
| BB3 | 30 |

FIG. 10

LUT_ER

| AG (°) | PX1_ER | PX2_ER |
|---|---|---|
| 10 | 40% | 60% |
| 20 | 35% | 65% |
| 30 | 30% | 70% |
| ⋮ | ⋮ | ⋮ |

LUT_LR

| AG (°) | PX1_LR | PX2_LR |
|---|---|---|
| 10 | 97% | 96% |
| 20 | 81% | 69% |
| 30 | 69% | 47% |
| ⋮ | ⋮ | ⋮ |

| AG (°) | TLR |
| --- | --- |
| 10 | 96% |
| 20 | 73% |
| 30 | 54% |
| ⋮ | ⋮ |

DISPLAY DEVICE FOR VEHICLE, METHOD OF DRIVING THE SAME, AND ELECTRONIC DEVICE

CROSS-REFERENCE TO RELATED APPLICATION

The present application claims priority to and the benefit of Korean Patent Application No. 10-2024-0106154, filed on Aug. 8, 2024, in the Korean Intellectual Property Office, the entire disclosure of which is incorporated herein by reference.

BACKGROUND

1. Field

Aspects of some embodiments of the present disclosure relate to a display device for vehicle, a method of driving the same, and an electronic device.

2. Description of the Related Art

Recently, the various uses of display devices have become more diverse. In addition, as display devices become relatively thinner and lighter, the range of uses has expanded, and as display devices are utilized in various fields, consumer demand for display devices capable of providing a high-quality image is increasing. A display device (that is, a display device for vehicle) may be located inside a vehicle so that images are provided to users sitting in a driver's seat or a passenger seat. However, when images provided to users sitting in the passenger seat catch a driver's attention, a risk of occurrence a traffic accident may increase.

The above information disclosed in this Background section is only for enhancement of understanding of the background and therefore the information discussed in this Background section does not necessarily constitute prior art.

SUMMARY

Aspects of some embodiments of the present disclosure include a display device for vehicle and an electronic device that determine light emission ratios of first and second pixels in each of blocks.

Aspects of some embodiments of the present disclosure include a method of driving a display device that drives a display device for vehicle.

According to some embodiments of the present disclosure, a display device for vehicle may include a display panel including a display area where a first pixel and a second pixel in which arrangements of a light blocking layer around a light emitting unit are different are located, and a display panel driver configured to drive the display panel, and the display panel driver may determine line of sight angles between each of blocks of the display area and a line of sight of a driver based on driver information, and determine a light emission ratio of the first pixel in each of the blocks and a light emission ratio of the second pixel in each of the blocks based on the line of sight angles for the blocks.

According to some embodiments, the driver information may include at least one of a position an eye of the driver, a position of a driver's seat, an angle of a side mirror, or an angle of a rearview mirror.

According to some embodiments, the light emission ratio of the first pixel of one of the blocks may decrease as the line of sight angle between the one of the blocks and the line of sight of the driver increases.

According to some embodiments, the light emission ratio of the first pixel and the light emission ratio of the second pixel may gradually change at a boundary portion of adjacent blocks among the blocks.

According to some embodiments, the display device for vehicle may further include a memory device configured to store a light emission ratio lookup table including the light emission ratio of the first pixel according to the line of sight angle and the light emission ratio of the second pixel according to the line of sight angle, and the light emission ratio of the first pixel and the light emission ratio of the second pixel are determined using the light emission ratio lookup table.

According to some embodiments, the display panel driver may determine the entire luminance ratio according to the line of sight angle based on the light emission ratio lookup table, a luminance ratio of the first pixel according to the line of sight angle, and a luminance ratio of the second pixel according to the line of sight angle, and update the light emission ratio lookup table based on the entire luminance ratio according to the line of sight angle.

According to some embodiments, the entire luminance ratio according to the line of sight angle may be a value obtained by adding a product of the light emission ratio of the first pixel according to the line of sight angle and the luminance ratio of the first pixel according to the line of sight angle and a product of the light emission ratio of the second pixel according to the line of sight angle and the luminance ratio of the second pixel according to the line of sight angle.

According to some embodiments, the display panel driver may update the light emission ratio lookup table based on the entire luminance ratio according to the line of sight angle being higher than a first reference luminance ratio according to the line of sight angle or lower than a second reference luminance ratio according to the line of sight angle.

According to some embodiments, the display panel driver may update the light emission ratio lookup table based on illuminance information.

According to some embodiments, the display panel driver may update the light emission ratio lookup table by increasing the light emission ratio of the first pixel according to the line of sight angle as an illuminance increases.

According to some embodiments, the display panel driver may update the light emission ratio lookup table by increasing a maximum value or a minimum value of the light emission ratio of the first pixel according to the line of sight angle as an illuminance increases.

According to some embodiments of the present disclosure, in a method of driving a display device including a display area where a first pixel and a second pixel in which arrangements of a light blocking layer around a light emitting unit are different are located, the method may include determining line of sight angles between each of blocks of the display area and a line of sight of a driver based on driver information, and determining a light emission ratio of the first pixel in each of the blocks and a light emission ratio of the second pixel in each of the blocks based on the line of sight angles for the blocks.

According to some embodiments, the driver information may include at least one of a position an eye of the driver, a position of a driver's seat, an angle of a side mirror, or an angle of a rearview mirror.

According to some embodiments, the light emission ratio of the first pixel of one of the blocks may decrease as the line of sight angle between the one of the blocks and the line of sight of the driver increases.

According to some embodiments, the light emission ratio of the first pixel and the light emission ratio of the second pixel may gradually change at a boundary portion of adjacent blocks among the blocks.

According to some embodiments, the light emission ratio of the first pixel and the light emission ratio of the second pixel may be determined using a light emission ratio lookup table including the light emission ratio of the first pixel according to the line of sight angle and the light emission ratio of the second pixel according to the line of sight angle, and the method may further include updating the light emission ratio lookup table.

According to some embodiments, updating the light emission ratio lookup table may include determining the entire luminance ratio according to the line of sight angle based on the light emission ratio lookup table, a luminance ratio of the first pixel according to the line of sight angle, and a luminance ratio of the second pixel according to the line of sight angle, and updating the light emission ratio lookup table based on the entire luminance ratio according to the line of sight angle.

According to some embodiments, the light emission ratio lookup table may be updated based on the entire luminance ratio according to the line of sight angle being higher than a first reference luminance ratio according to the line of sight angle or lower than a second reference luminance ratio according to the line of sight angle.

According to some embodiments, updating the light emission ratio lookup table may include updating the light emission ratio lookup table based on illuminance information.

According to some embodiments of the present disclosure, an electronic device includes a processor configured to provide input image data, and a display device configured to display an image based on the input image data. According to some embodiments, the display device includes a display panel including a display area where a first pixel and a second pixel in which arrangements of a light blocking layer around a light emitting unit are different are located, and a display panel driver configured to drive the display panel. According to some embodiments, the display panel driver determines a light emission ratio of the first pixel and a light emission ratio of the second pixel based on a line of sight angle between the display area and a line of sight of a user.

According to some embodiments, the display device for vehicle and the electronic device including the display device may minimize or reduce the light emission ratio of the second pixel which may require a relatively high driving current to display the same brightness, by appropriately determining the light emission ratios of the first and second pixels. Accordingly, power consumption of the display device for vehicle and the electronic device may be relatively reduced, burn-in may be prevented or reduced, and a lifespan of the second pixel may be relatively increased.

However, the characteristics of embodiments according to the present disclosure are not limited to the characteristics described above, and may be variously expanded without departing from the spirit and scope of embodiments according to the present disclosure.

BRIEF DESCRIPTION OF THE DRAWINGS

The above and other features of some embodiments of the present disclosure will become more apparent by describing in further detail aspects of some embodiments thereof with reference to the accompanying drawings, in which:

FIG. 3 is a block diagram illustrating a display device according to some embodiments of the present disclosure;

FIG. 9 is a table illustrating an example of line of sight angles for blocks of FIG. 8;

FIG. 10 is a table illustrating an example of a light emission ratio lookup table of FIG. 8;

DETAILED DESCRIPTION

Figure 1:
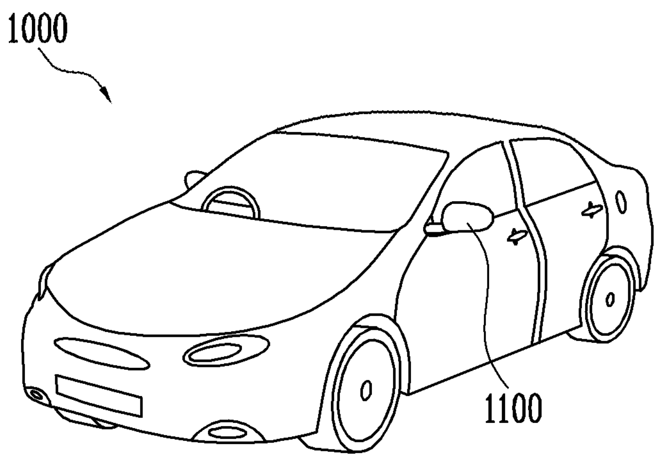
FIG. 1 is a drawing schematically illustrating an exterior of a vehicle according to some embodiments of the present disclosure.

Hereinafter, aspects of some embodiments of the present disclosure are described in more detail with reference to the accompanying drawings. It should be noted that in the following description, only portions necessary for understanding an operation according to the disclosure are described, and descriptions of other portions are omitted in order not to obscure the subject matter of the disclosure. In addition, the disclosure may be embodied in other forms without being limited to the embodiments described herein. However, the embodiments described herein are provided to describe in sufficient detail to enable a person having ordinary skill in the art to implement the technical spirit of the disclosure to those skilled in the art to which the disclosure belongs.

Throughout the specification, in a case where a portion is "connected" to another portion, the case includes not only a case where the portion is "directly connected" but also a case where the portion is "indirectly connected" with another element interposed therebetween. Terms used herein are for describing specific embodiments and are not intended to limit the disclosure. Throughout the specification, in a case where a certain portion "includes", the case means that the portion may further include another component without excluding another component unless otherwise stated. "At least any one of X, Y, and Z" and "at least any one selected from a group configured of X, Y, and Z" may be interpreted as one X, one Y, one Z, or any combination of two or more of X, Y, and Z (for example, XYZ, XYY, YZ, and ZZ). Here, "and/or" includes all combinations of one or more of corresponding configurations.

Here, terms such as first and second may be used to describe various components, but these components are not limited to these terms. These terms are used to distinguish one component from another component. Therefore, a first component may refer to a second component within a range without departing from the scope disclosed herein.

Spatially relative terms such as "under", "on", and the like may be used for descriptive purposes, thereby describing a relationship between one element or feature and another element(s) or feature(s) as shown in the drawings. Spatially relative terms are intended to include other directions in use, in operation, and/or in manufacturing, in addition to the direction depicted in the drawings. For example, when a device shown in the drawing is turned upside down, elements depicted as being positioned "under" other elements or features are positioned in a direction "on" the other elements or features. Therefore, in the present disclosure, the term "under" may include both directions of on and under. In addition, the device may face in other directions (for example, rotated 90 degrees or in other directions) and thus the spatially relative terms used herein are interpreted according thereto.

Various embodiments are described with reference to drawings schematically illustrating ideal embodiments. Accordingly, it will be expected that shapes may vary, for example, according to tolerances and/or manufacturing techniques. Therefore, the embodiments disclosed herein cannot be construed as being limited to shown specific shapes, and should be interpreted as including, for example, changes in shapes that occur as a result of manufacturing. As described above, the shapes shown in the drawings may not show actual shapes of areas of a device, and the present embodiments are not limited thereto.

Hereinafter, aspects of some embodiments of the present disclosure are described in more detail with reference to the attached drawings.

Figure 2:
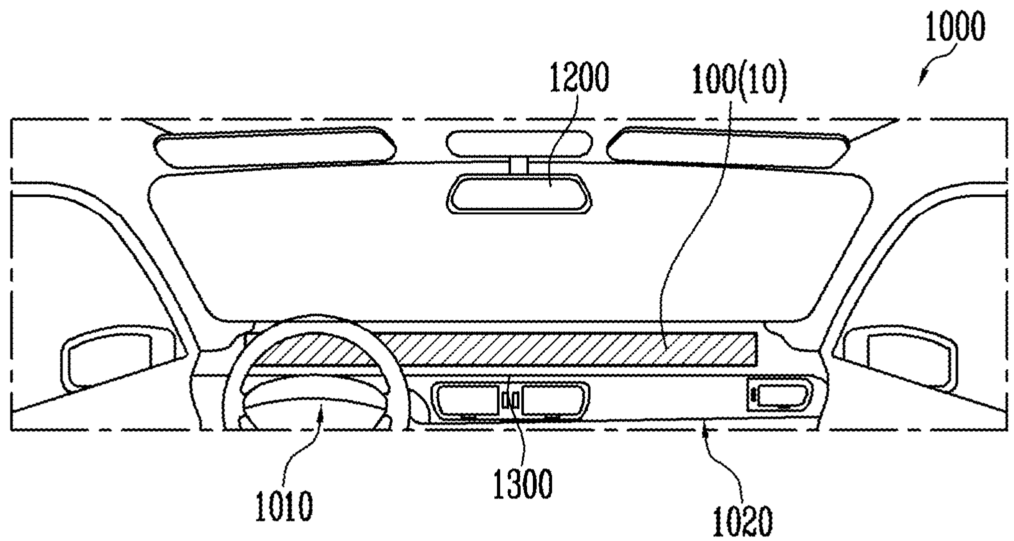
FIG. 2 is a drawing schematically illustrating an interior of a vehicle according to some embodiments of the present disclosure.

FIG. 1 is a drawing schematically illustrating an exterior of a vehicle according to some embodiments of the present disclosure, and FIG. 2 is a drawing schematically illustrating an interior of a vehicle according to some embodiments of the present disclosure.

Referring to FIGS. 1 and 2, a vehicle 1000 may refer to various devices that move a transported object such as a human, an object, or an animal from a starting point to a destination. The vehicle 1000 may include a vehicle that runs on a road or a track, a ship that moves on a sea or a river, an airplane that flies in a sky using action of air.

The vehicle 1000 may run on a road or a track. The vehicle 1000 may move in a direction (e.g., a set or predetermined direction) according to rotation of at least one wheel. For example, the vehicle 1000 may include a three-wheeled or four-wheeled vehicle, construction equipment, a two-wheeled vehicle, a motorized device, a bicycle, and a train that runs on a track.

The vehicle 1000 may include a body having an interior and an exterior, and a chassis on which a mechanical device required for driving is installed, as a remaining portion excluding the body. The exterior of the body may include a front panel, a bonnet, a roof panel, a rear panel, a trunk, and a filler provided at a boundary between doors. The chassis of the vehicle 1000 may include a power generation device, a power transmission device, a driving device, a steering device, a braking device, a suspension device, a transmission device, a fuel device, front, rear, left, and right wheels, and the like.

The vehicle 1000 may include a side mirror 1100, a rear mirror 1200, a dashboard 1300, and a display device 10.

The side mirror 1100 may provide a view of the rear of the vehicle 1000. The side mirror 1100 may be installed on the exterior of the body. A plurality of side mirrors 1100 may be provided.

A display panel 100 may be located on the dashboard 1300. The display device may be located inside the vehicle, and the display device may include the display panel 100 and a display panel driver that drives the display panel 100.

A portion (for example, a first block BB1 refer to FIG. 5) positioned in front of a driver's seat 1010 of the display panel 100 may display a cluster. For example, the cluster may have a tachometer, a speedometer, a coolant temperature gauge, a fuel gauge, a turn signal indicator, a high beam indicator, a warning light, a seat belt warning light, a trip meter, a trip recorder, an automatic transmission selector lever indicator, a door open warning light, an engine oil warning light, and/or a low fuel warning light.

A portion (for example, a second block BB2 (refer to FIG. 5) positioned in front between the driver's seat 1010 and a passenger seat 1020 of the display panel 100 may display a center fascia. For example, the center fascia may include a plurality of buttons for adjusting an audio device, an air conditioning device, and a seat heater.

The display device 10 may include a liquid crystal display, an electrophoretic display, an organic light emitting display, an inorganic light emitting display, a field emission display, a surface-conduction electron emitter display, a quantum dot display, a plasma display, a cathode ray display, and the like.

Figure 3:
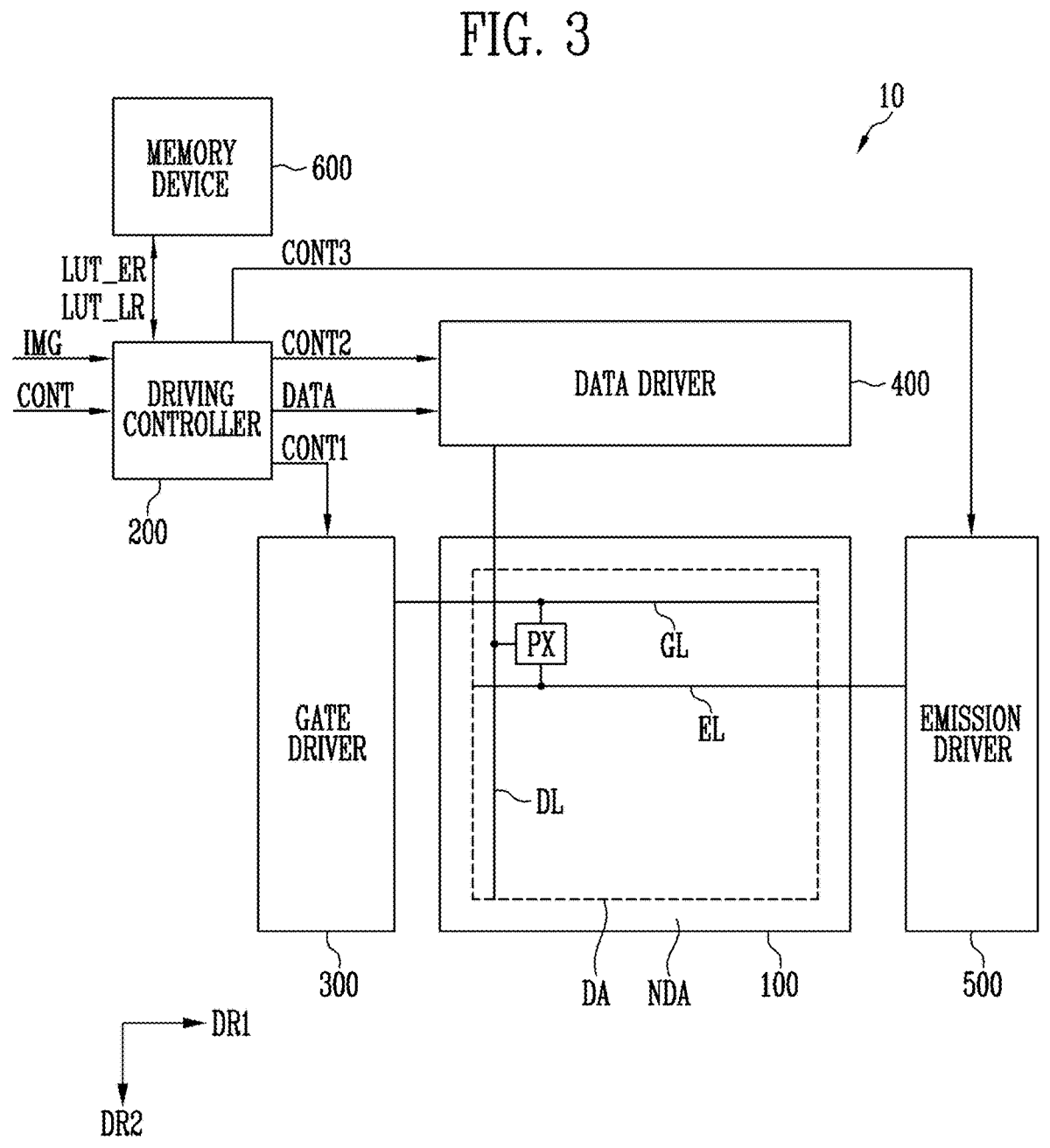

FIG. 3 is a block diagram illustrating a display device according to embodiments of the disclosure.

Referring to FIG. 3, the display device may include the display panel 100 and the display panel driver, and the display panel driver may include a driving controller 200, a gate driver 300, a data driver 400, an emission driver 500, and a memory device 600. According to some embodiments, the driving controller 200 and the data driver 400 may be integrated into one chip.

The display panel 100 may include a display area DA displaying an image and a non-display area NDA located adjacent to (e.g., in a periphery or outside a footprint of) the display area DA. According to some embodiments, the gate driver 300 and the emission driver 500 may be mounted in the non-display area NDA.

The display panel 100 may include a plurality of gate lines GL, a plurality of data lines DL, a plurality of emission lines EL, and a plurality of pixels PX electrically connected to the gate lines GL, the data lines DL, and the emission lines EL. The gate lines GL and the emission lines EL may extend in a first direction DR1, and the data lines DL may extend in a second direction DR2 crossing the first direction DR1. Although FIG. 3 illustrates a single pixel PX, a single gate line GL, a single data line DL, and a single emission line EL, as a person having ordinary skill in the art would appreciate, the display panel 100 may include any suitable number of pixels PX, gate lines GL, data lines DL, and emission lines EL, according to the design and size of the display panel 100.

The driving controller 200 may receive input image data IMG and an input control signal CONT from a main processor (for example, a graphic processing unit (GPU) or the like). For example, the input image data IMG may include red image data, green image data, and blue image data. According to some embodiments, the input image data IMG may further include white image data. As another example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 for controlling an operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling an operation of the data driver 400 based on the input control signal CONT and output the second control signal CONT2 to the data driver 400. The second control signal CONT2 may include a horizontal start signal and a load signal.

The driving controller 200 may generate the data signal DATA by receiving the input image data IMG and the input control signal CONT. The driving controller 200 may output the data signal DATA to the data driver 400.

The driving controller 200 may generate the third control signal CONT3 for controlling an operation of the emission driver 500 based on the input control signal CONT and output the third control signal CONT3 to the emission driver 500. The third control signal CONT3 may include a vertical start signal and an emission clock signal.

The gate driver 300 may generate gate signals for driving the gate lines GL in response to the first control signal CONT1 received from the driving controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the driving controller 200. The data driver 400 may generate data voltages obtained by converting the data signal DATA into an analog voltage. The data driver 400 may output the data voltages to a data line DL.

The emission driver 500 may generate emission signals for driving the emission lines EL in response to the third control signal CONT3 received from the driving controller 200. The emission driver 500 may output the emission signals to the emission lines EL. For example, the emission driver 500 may sequentially output the emission signals to the emission lines EL. The pixel PX may emit light in response to the emission signal.

The memory device 600 may store a light emission ratio lookup table LUT_ER and a luminance ratio lookup table LUT_LR. For example, the memory device 600 may be a nonvolatile memory device. The memory device 600 may provide the lookup tables LUT_ER and LUT_LR to the driving controller 200.

According to some embodiments, the driving controller 200 may update at least one of the lookup tables LUT_ER or LUT_LR and provide the updated at least one to the memory device 600.

Figure 4:
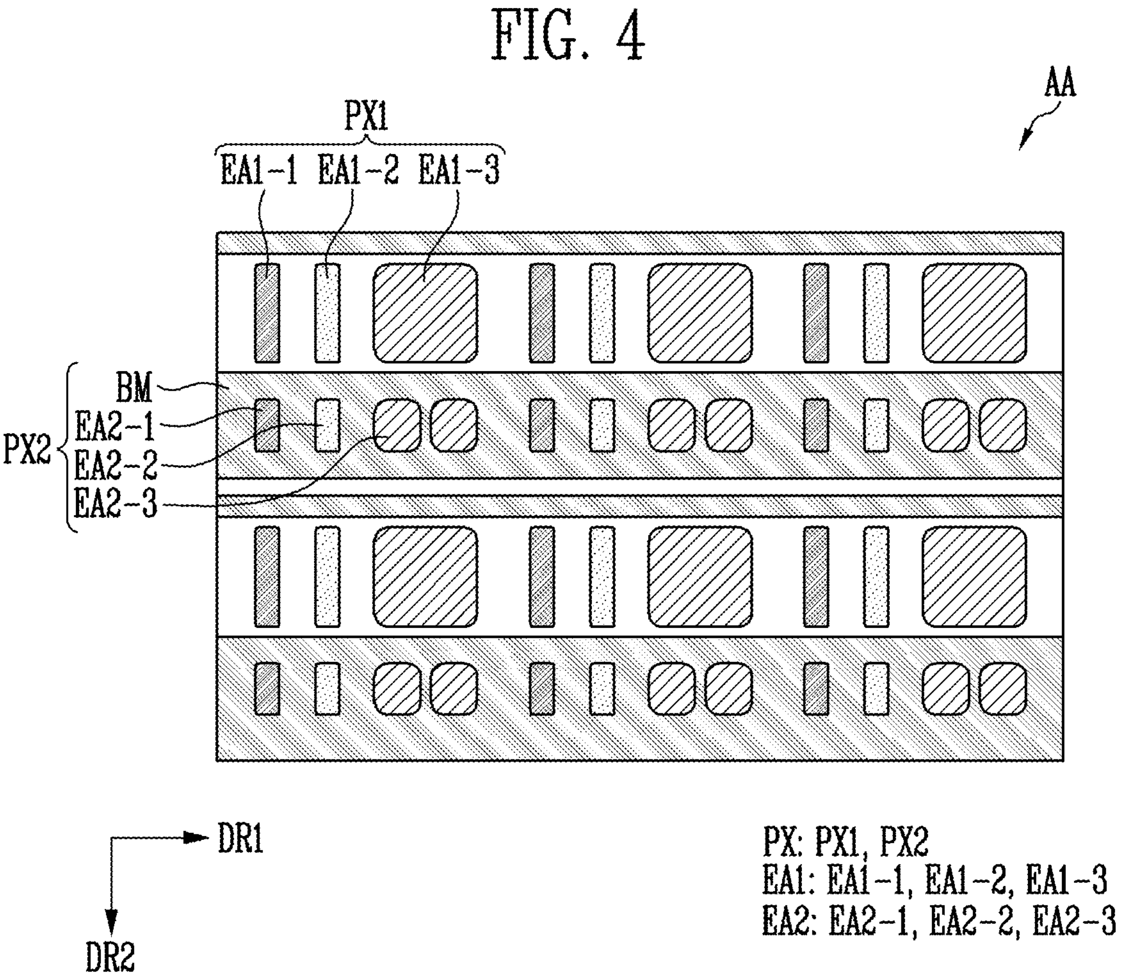
FIG. 4 is a drawing illustrating an example of a pixel of FIG. 3.

FIG. 4 is a diagram illustrating an example of the pixel of FIG. 3.

Referring to FIG. 4, the pixels PX included in the display area AA may include a first pixel PX1 and a second pixel PX2. The first pixel PX1 may be a normal pixel that displays images with a general viewing angle. The second pixel PX2 may be a private pixel that displays images with a limited viewing angle. That is, the second pixel PX2 may have a viewing angle narrower than that of the first pixel PX1.

The pixels PX1 and PX2 may include a plurality of light emitting units (or light emitting portions) EA1 and EA2 that emit light in the display area AA. The first pixel PX1 includes first light emitting units EA1, and the second pixel PX2 includes second light emitting units EA2. The plurality of light emitting units EA1 and EA2 may be defined as an area in which a pixel electrode is exposed by an opening of a pixel defining layer on a cross-sectional view, and an area in which the exposed pixel electrode and an emission layer overlap.

The light emitting units EA1 and EA2 may include first sub-light emitting unit EA1-1 and EA2-1, second sub-light emitting units EA1-2 and EA2-2, and third sub-light emitting units EA1-3 and EA2-3, respectively. For example, the first light emitting unit EA1 may include the first sub-light emitting unit EA1-1 that emits red light, the second sub-light emitting unit EA1-2 that emits green light, and the third sub-light emitting unit EA1-3 that emits blue light. Similarly to this, the second light emitting unit EA2 may include the first sub-light emitting unit EA2-1 that emits red light, the second sub-light emitting unit EA2-2 that emits green light, and the third sub-light emitting unit EA2-3 that emits blue light.

The first to third sub-light emitting units EA1-1 to EA1-3 and EA2-1 to EA2-3 may be arranged along the first direction DR1. However, the disclosure is not limited to an arrangement form of the first to third sub-light emitting units EA1-1 to EA1-3 and EA2-1 to EA2-3.

The second pixel PX2 may further include a light blocking layer BM. The light blocking layer BM may be located between the first to third sub-light emitting units EA2-1 to EA2-3 of the second light emitting unit EA2. The light blocking layer BM may be arranged around the second light emitting unit EA2 to limit a viewing angle of light emitted from the second light emitting unit EA2. The light blocking layer BM is spaced apart from the first light emitting unit EA1 of the first pixel PX1, and a viewing angle of light emitted from the first light emitting unit EA1 is not substantially limited by the light blocking layer BM.

As described above, an arrangement of the light blocking layer BM around the light emitting units EM1 and EM2 in the first pixel PX1 and the second pixel PX2 is different, and the first pixel PX1 and the second pixel PX2 may have different viewing angles due to an arrangement difference of the light blocking layer BM.

Figures 5, 6:
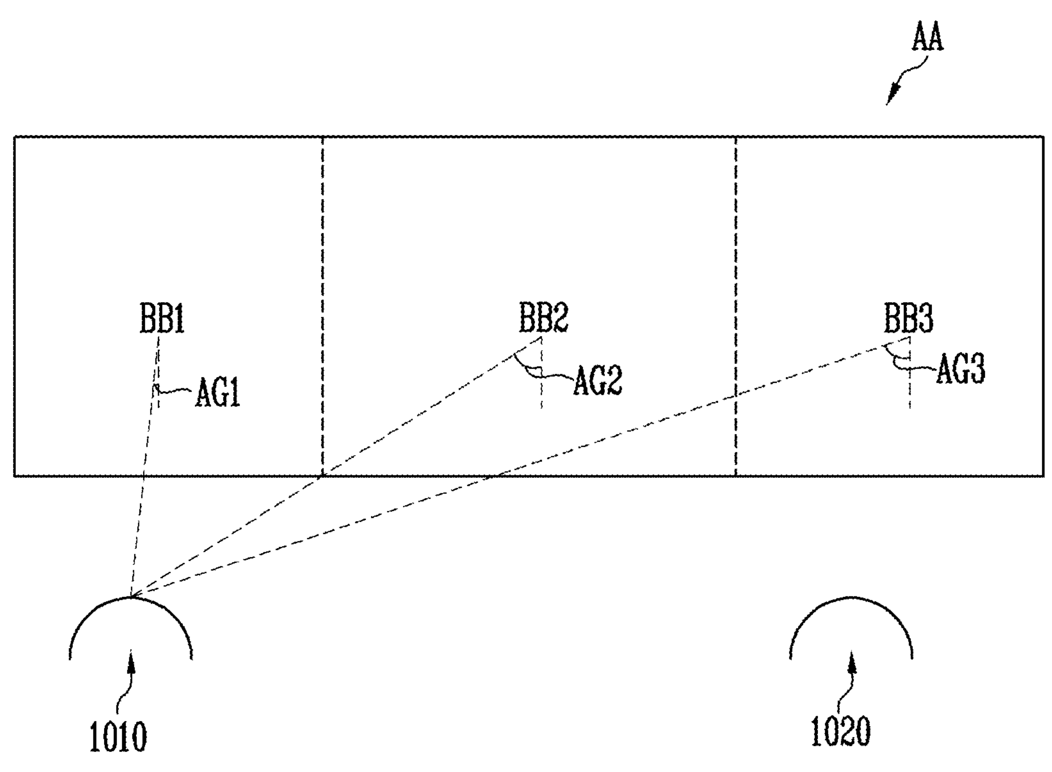
FIG. 5 is a drawing illustrating an example of a display area of FIG. 3.
FIG. 6 is a drawing illustrating an example of a display area of FIG. 3.

FIG. 5 is a drawing illustrating an example of the display area of FIG. 3, and FIG. 6 is a drawing illustrating an example of the display area of FIG. 3.

Referring to FIG. 5, the display area AA may be divided into first to third blocks BB1 to BB3. For example, the first block BB1 may be located in front of the driver's seat 1010 and may display the cluster. For example, the second block BB2 may be located between the driver's seat 1010 and the passenger's seat 1020 and may display the center fascia. For example, the third block BB3 may be located in front of the passenger's seat 1020.

Referring to FIG. 6, the display area AA may be divided into a first block BB1, (2-1)-th to (2-9)-th blocks BB2-1 to BB2-9, and (3-1)-th to (3-3)-th blocks BB3-1 to BB3-3.

The disclosure is not limited to the number and a form of blocks BB that divide the display area AA. However, for convenience of description, hereinafter, the disclosure is described based on the blocks BB of FIG. 5.

Referring to FIGS. 3, 5, and 6, the driving controller 200 may determine a light emission ratio PX1_ER (refer to FIG. 8) of the first pixel PX1 (refer to FIG. 4) in each of the blocks BB and a light emission ratio PX2_ER (refer to FIG. 8) of the second pixel PX2 (refer to FIG. 4) in each of the blocks BB. A detailed description thereof is described later.

Figure 7:
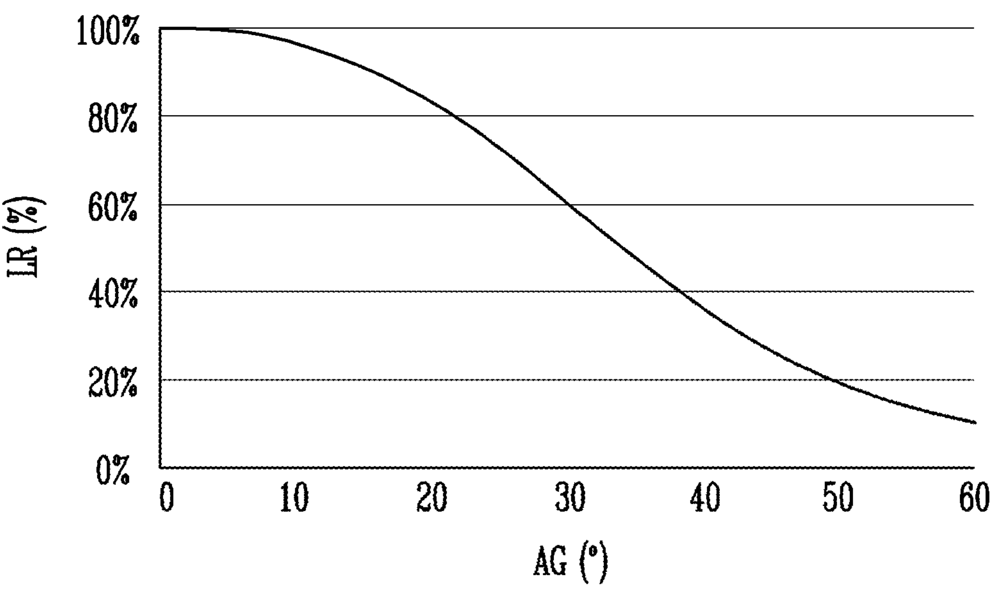
FIG. 7 is a graph illustrating a luminance ratio according to a line of sight angle.

FIG. 7 is a graph illustrating a luminance ratio according to a line of sight angle.

Referring to FIGS. 5 and 7, a line of sight angle AG may be an angle between each of the blocks BB and a view of a driver seated in the driver's seat 1010. For example, a first line of sight angle AG1 for the first block BB1 positioned in front of the driver's seat 1010 may be less than a second line of sight angle AG2 for the second block BB2 and a third line of sight angle AG3 for the third block BB3. Similarly, the second line of sight angle AG2 may be less than the third line of sight angle AG3.

A luminance ratio LR may be decreased as the line of sight angle AG increases. The luminance ratio LR when the line of sight angle AG is 0° is 100%, and the luminance ratio LR at the remaining line of sight angle AG means a ratio of a luminance to a luminance when the line of sight angle AG is 0°. For example, when a luminance when the line of sight angle AG is 30° is 60% of a luminance when the line of sight angle AG is 0°, the luminance ratio LR when the line of sight angle AG is 30° may be 60%.

Figure 8:
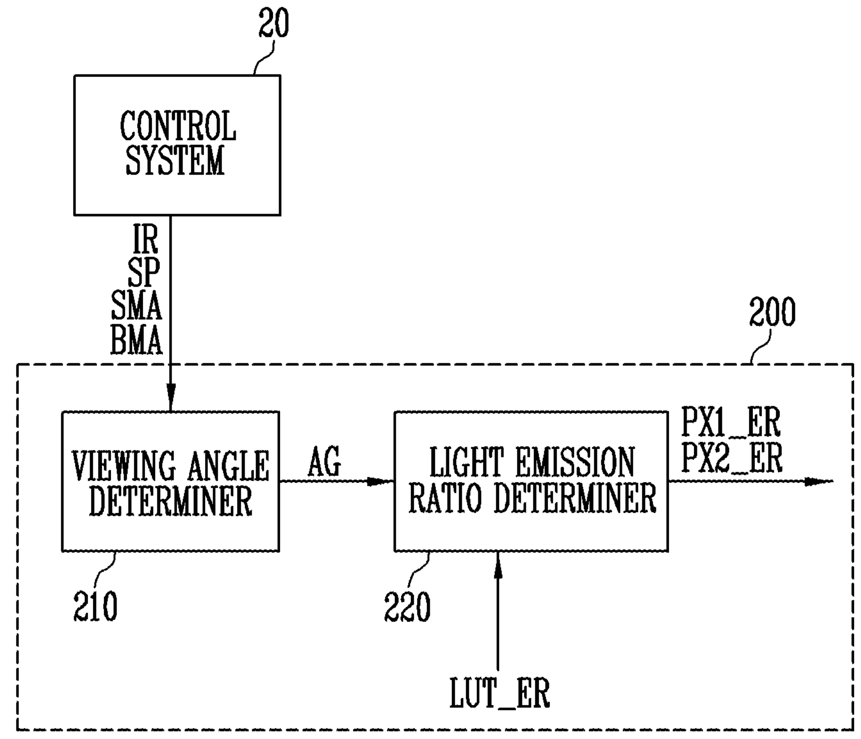
FIG. 8 is a block diagram illustrating a portion of a driving controller of FIG. 3 and an example of a control system of a vehicle.

FIG. 8 is a block diagram illustrating an example of a portion of the driving controller of FIG. 3 and a control system of the vehicle, FIG. 9 is a table illustrating an example of line of sight angles for the blocks of FIG. 8, and FIG. 10 is a table illustrating an example of a light emission ratio lookup table of FIG. 8.

FIG. 8 omits configurations except for a viewing angle determiner 210 and a light emission ratio determiner 220 for convenience of description.

Referring to FIGS. 2 to 5 and FIG. 8, the vehicle may include a control system 20. The control system 20 may control components installed in the vehicle. For example, the control system 20 may control an infrared camera, the side mirror 1100, the rearview mirror 1200, a seat, and the like installed in the vehicle. In various embodiments of the disclosure, the control system 20 may be implemented in a form of hardware, software, firmware, or an application-specific integrated circuit (ASIC).

The driving controller 200 may include the viewing angle determiner 210 and the light emission ratio determiner 220.

Referring to FIGS. 2 to 5, 8, and 9, the viewing angle determiner 210 may determine the line of sight angles AG between each of the blocks of the display area and a line of sight of the driver based on driver information IR, SP, SMA, and BMA. For example, the driver information may include at least one of a position IR of an eye of the driver, a position SP of a seat of the driver's seat 1010, an angle SMA of the side mirror 1100, or an angle BMA of the rearview mirror 1200.

For example, as shown in FIG. 9, the line of sight angle AG for the first block BB1 may be 10°, the line of sight angle AG for the second block BB2 may be 20°, and the line of sight angle AG for the third block BB3 may be 30°.

The vehicle may include an infrared sensor. The infrared sensor may continuously track the position of the eye of the driver. In addition, the control system 20 may receive information on the position IR of the eye of the driver from the infrared sensor and provide the information to the viewing angle determiner 210.

The control system 20 may control the seat of the driver's seat 1010, the side mirror 1100, and the rearview mirror 1200. The position SP of the seat of the driver's seat 1010, the angle SMA of the side mirror 1100, and the angle BMA of the rearview mirror 1200 may be adjusted so that an outside of the vehicle may be clearly seen when the driver sits in the driver's seat 1010. Therefore, the viewing angle determiner 210 may determine the line of sight angles AG for each of the blocks BB through the position IR of the eye of the driver, the position SP of the seat of the driver's seat 1010, the angle SMA of the side mirror 1100, and the rearview mirror 1200.

Referring to FIGS. 2 to 5 and 8 to 10, the light emission ratio determiner 220 may determine the light emission ratio PX1_ER of the first pixel PX1 in each of the blocks BB and the light emission ratio PX2_ER of the second pixel PX2 in each of the blocks BB based on the line of sight angles AG for the blocks BB. In addition, the driving controller 200 may generate the third control signal CONT3 based on the light emission ratios PX1_ER and PX2_ERN to control the emission driver 500.

According to some embodiments, the memory device 600 may store a light emission ratio lookup table LUT_ER including the light emission ratio PX1_ER of the first pixel PX1 according to the line of sight angle AG and the light emission ratio PX2_ER of the second pixel PX2 according to the line of sight angle AG. The light emission ratio determiner 220 may determine the light emission ratio PX1_ER of the first pixel PX1 and the light emission ratio PX2_ER of the second pixel PX2 using the light emission ratio lookup table LUT_ER.

For example, as shown in FIGS. 9 and 10, because when the line of sight angle AG is 10°, the light emission ratio PX1_ER of the first pixel PX1 is 40%, the light emission ratio PX2_ER of the second pixel PX2 is 60%, and the line of sight angle AG of the first block BB1 is 10°, the light emission ratio PX1_ER of the first pixel PX1 in the first block BB1 may be 40%, and the light emission ratio PX2_ER of the second pixel PX2 in the first block BB1 may be 60%. That is, only 40% of the first pixels PX1 of the first block BB1 may emit light, and only 60% of the second pixels PX2 of the first block BB1 may emit light.

An image of the passenger seat 1020 is an image provided to a user sitting in the passenger seat, and when the image catches driver's attention, a risk of occurrence of a traffic accident is high. Therefore, as the line of sight angle AG of the driver increases, the light emission ratio PX2_ER of the second pixel PX2 with a relatively narrow viewing angle may increase, and the light emission ratio PX1_ER of the first pixel PX1 with a relatively wide viewing angle may decrease.

According to some embodiments, the light emission ratio PX1_ER of the first pixel PX1 and the light emission ratio PX2_ER of the second pixel PX2 may gradually change at a boundary portion of adjacent blocks BB among the blocks BB. For example, the light emission ratios PX1_ER and PX2_ER determined by the light emission ratio determiner 220 may be applied to a central portion of each block BB. In addition, the light emission ratios PX1_ER and PX2_ER in an area between central portions of the blocks BB may be gradually changed through interpolation or the like.

Figures 11, 12:
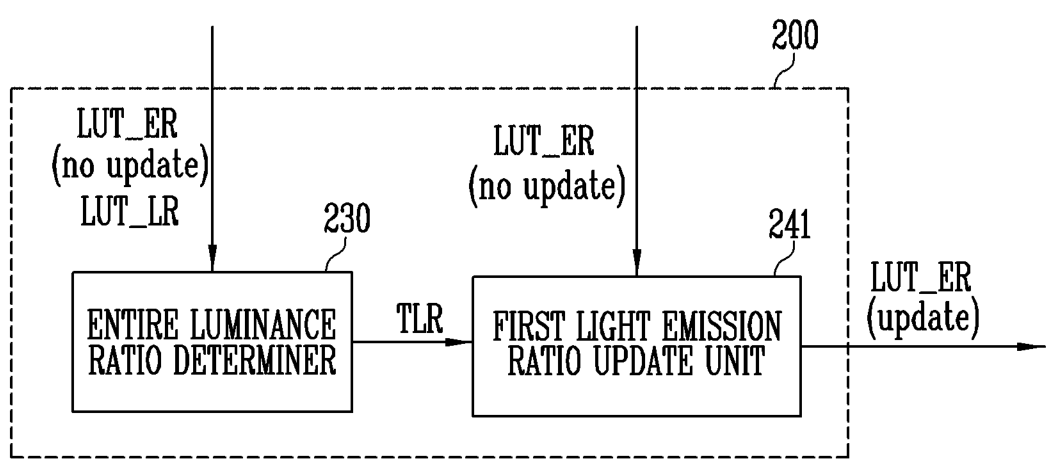
FIG. 11 is a block diagram illustrating another portion of the driving controller of FIG. 3.
FIG. 12 is a table illustrating an example of a luminance ratio lookup table of FIG. 11.
Figures 13, 14:
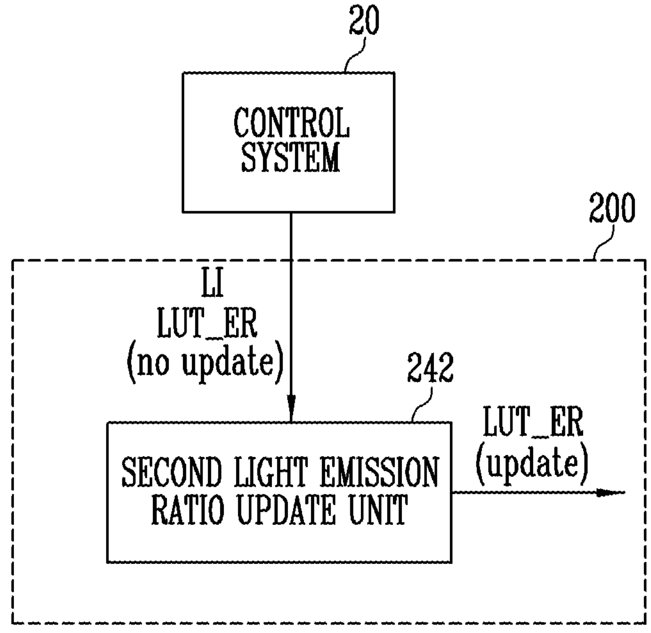
FIG. 13 is a table illustrating an example of the entire luminance ratio of FIG. 11.
FIG. 14 is a block diagram illustrating still another portion of a driving controller of FIG. 3.

FIG. 11 is a block diagram illustrating another portion of the driving controller of FIG. 3, FIG. 12 is a table illustrating an example of the luminance ratio lookup table of FIG. 11, and FIG. 13 is a table illustrating an example of the entire luminance ratio of FIG. 11.

FIG. 11 omits components except for an entire luminance ratio determiner 230 and a first light emission ratio update unit 241 for convenience of description.

Referring to FIG. 11, the driving controller 200 may include the entire luminance ratio determiner 230 and the first light emission ratio update unit 241.

The entire luminance ratio determiner 230 may determine the entire luminance ratio TLR according to the line of sight angle AG based on the light emission ratio lookup table LUT_ER, the luminance ratio LR of the first pixel PX1 according to the line of sight angle AG, and the luminance ratio LR of the second pixel PX2 according to the line of sight angle AG, and may update the light emission ratio lookup table LUT_ER based on the entire luminance ratio TLR according to the line of sight angle AG. The updated light emission ratio lookup table LUT_ER may be provided to the memory device 600 (refer to FIG. 3).

Referring to FIGS. 10 to 13, the entire luminance ratio determiner 230 may determine the entire luminance ratio TLR according to the line of sight angle AG by using the luminance ratio lookup table LUT_LR including the luminance ratio LR of the first pixel PX1 according to the line of sight angle AG and the luminance ratio LR of the second pixel PX2 according to the line of sight angle AG.

According to some embodiments, the entire luminance ratio TLR according to the line of sight angle AG may be a value obtained by adding a product of the light emission ratio PX1_ER of the first pixel PX1 according to the line of sight angle AG and the luminance ratio PX1_LR of the first pixel PX1 according to the line of sight angle AG and a product of the light emission ratio PX2_ER of the second pixel PX2 according to the line of sight angle AG and the luminance ratio PX2_LR of the second pixel PX2 according to the line of sight angle AG.

For example, as shown in FIG. 10 and FIG. 12, when the line of sight angle AG is 10°, the light emission ratio PX1_ER of the first pixel PX1 may be 40%, the light emission ratio PX2_ER of the second pixel PX2 may be 60%, the luminance ratio PX1_LR of the first pixel PX1 may be 97%, and the luminance ratio PX2_LR of the second pixel PX2 may be 96%. In this case, the entire luminance ratio TLR may be 97%*0.4+96%*0.6=about 96%.

The first luminance ratio update unit 241 may update the light emission ratio lookup table LUT_ER when the entire luminance ratio TLR according to the line of sight angle AG is higher than a first reference luminance ratio according to the line of sight angle AG or lower than a second reference luminance ratio according to the line of sight angle AG. The first and second reference luminance ratios may be preset values.

For example, when the entire luminance ratio TLR at a specific line of sight angle is too low, the light emission ratio lookup table LUT_ER may be updated in a direction of increasing the light emission ratio PX1_ER of the first pixel PX1, and when the entire luminance ratio TLR at a specific line of sight angle is too high, the light emission ratio lookup table LUT_ER may be updated in a direction of decreasing the light emission ratio PX1_ER of the first pixel PX1.

For example, when the entire luminance ratio TLR at a specific line of sight angle is too low, the light emission ratio lookup table LUT_ER may be updated in a direction of decreasing the light emission ratio PX2_ER of the second pixel PX2, and when the entire luminance ratio TLR at a specific line of sight angle is too high, the light emission ratio lookup table LUT_ER may be updated in a direction of increasing the light emission ratio PX2_ER of the second pixel PX2.

FIG. 14 is a block diagram illustrating still another portion of the driving controller of FIG. 3.

Referring to FIGS. 4, 10, and 14, the driving controller 200 may include a second light emission ratio update unit 242.

The second light emission ratio update unit 242 may update the light emission ratio lookup table LUT_ER based on illuminance information LI.

The vehicle may include an illuminance sensor. The illuminance sensor may measure an illuminance inside the vehicle of the driver. In addition, the control system 20 may receive the illuminance information LI from the illuminance sensor and provide the illuminance information LI to the second light emission ratio update unit 242.

According to some embodiments, the second light emission ratio update unit 242 may update the light emission ratio lookup table LUT_ER by increasing the light emission ratio PX1_ER of the first pixel PX1 according to the line of sight angle AG or decreasing the light emission ratio PX2_ER of the second pixel PX2 according to the line of sight angle AG as the illuminance increases.

According to some embodiments, the second light emission ratio update unit 242 may update the light emission ratio lookup table LUT_ER by increasing a maximum value or a minimum value of the light emission ratio PX1_ER of the first pixel PX1 according to the line of sight angle AG or decreasing a maximum value or a minimum value of the light emission ratio PX2_ER of the second pixel PX2 according to the line of sight angle AG as the illuminance increases.

Accordingly, visibility of an image displayed through the display panel 100 may be improved even in an environment in which an illuminance is high.

Figure 15:
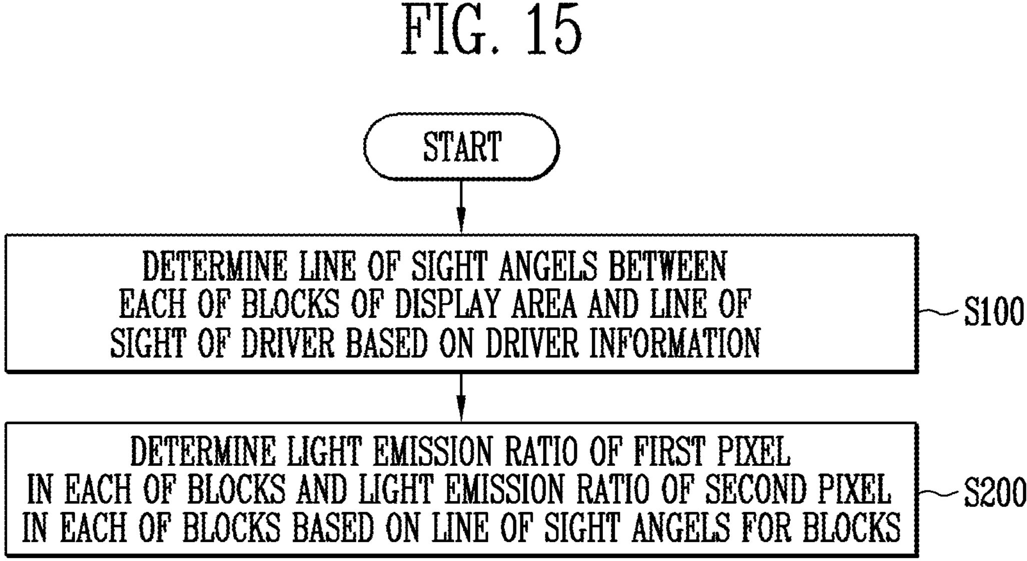
FIG. 15 is a flowchart illustrating a method of driving a display device for vehicle according to some embodiments of the present disclosure.

FIG. 15 is a flowchart illustrating aspects of a method of driving a display device for vehicle according to embodiments of the disclosure. Although FIG. 15 illustrates various operations in a method of driving a display device, embodiments according to the present disclosure may vary, and according to some embodiments, the method may include additional operations or fewer operations, or the order of operations may vary, unless otherwise stated or implied, without departing from the spirit and scope of embodiments according to the present disclosure.

Referring to FIG. 15, the method of driving the display device for vehicle may determine line of sight angles between each of blocks of a display area and a line of sight of a driver based on driver information (S100), and determine a light emission ratio of a first pixel in each of the blocks and a light emission ratio of a second pixel in each of the blocks based on the line of sight angles for the blocks (S200). Because a specific description thereof is described with reference to FIGS. 1 to 14, an overlapping description is omitted.

Figure 16:
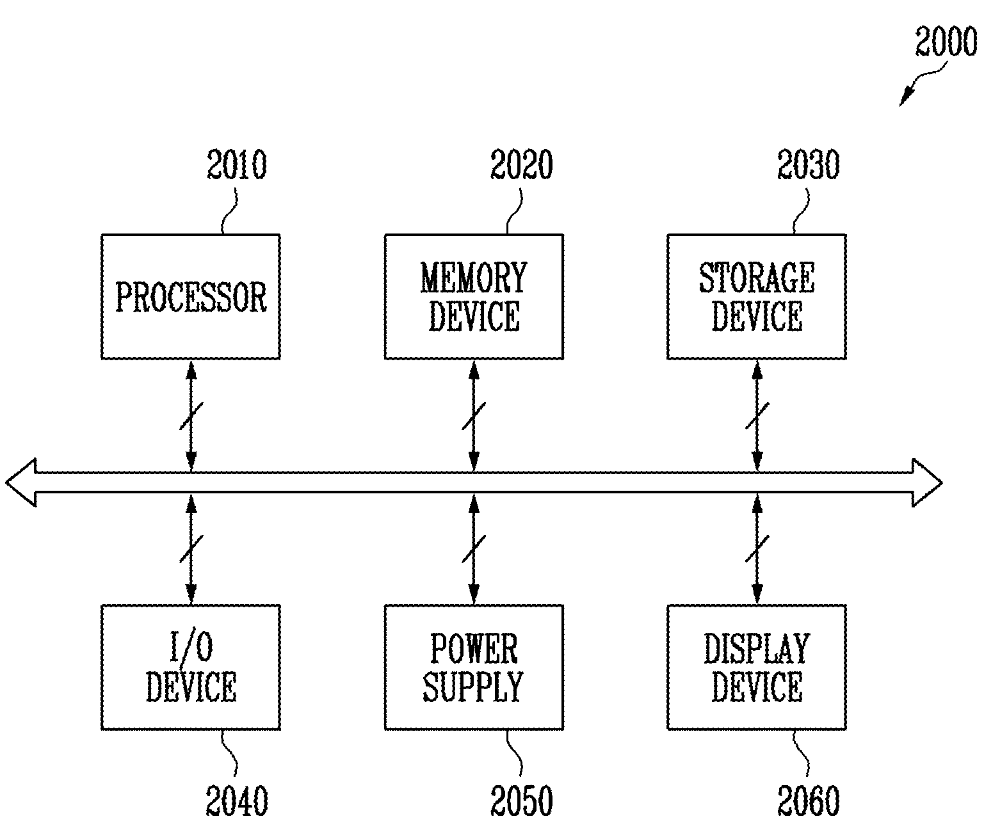
FIG. 16 is a block diagram illustrating an electronic device according to some embodiments of the present disclosure.

FIG. 16 is a block diagram illustrating an electronic device according to embodiments of the disclosure.

Referring to FIG. 16, the electronic device 2000 (an electronic equipment) may include a processor 2010, a memory device 2020, a storage device 2030, an input/output device 2040, a power supply device 2050, and a display device 2060. At this time, the display device 2060 may be the display device of FIG. 3. In addition, the electronic device 2000 may further include several ports that may communicate with a video card, a sound card, a memory card, a USB device, and the like or may communicate with other systems. According to some embodiments, the electronic device 2000 may be implemented as a smart phone. However, this is an example, and the electronic device 2000 is not limited thereto. For example, the electronic device 2000 may be implemented as a mobile phone, a television, a video phone, a smart pad, a smart watch, a tablet PC, a vehicle navigation system, a computer monitor, a laptop, a head-mounted display device, or the like.

The processor 2010 may perform specific calculations or tasks. According to some embodiments, the processor 2010 may be a microprocessor, a central processing unit, an application processor, or the like. The processor 2010 may be connected to other components through an address bus, a control bus, a data bus, and the like. According to some embodiments, the processor 2010 may also be connected to an expansion bus such as a peripheral component interconnect (PCI) bus.

The memory device 2020 may store data required for an operation of the electronic device 2000. For example, the memory device 2020 may include a nonvolatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, and a ferroelectric random access memory (FRAM) device, and/or a volatile memory device such as a dynamic random access memory (DRAM) device, a static random access memory (SRAM) device, and a mobile DRAM device.

The storage device 2030 may include a solid state drive (SSD), a hard disk drive (HDD), a CD-ROM, and the like.

The input/output device 2040 may include input means such as a keyboard, a keypad, a touchpad, a touchscreen, and a mouse, and output means such as a speaker, a printer, and the like. According to some embodiments, the display device 2060 may be included in the input/output device 2040.

The power supply device 2050 may supply power required for an operation of the electronic device 2000. For example, the power supply device 2050 may be a power management integrated circuit PMIC.

The display device 2060 may display an image corresponding to visual information of the electronic device 2000. At this time, the display device 2060 may be an organic light emitting display device or a quantum dot light emitting display device, but is not limited thereto. The display device 2060 may be connected to other components through the above-described buses or another communication link.

Although aspects of some embodiments and application examples are described herein, they are provided only to facilitate a more general understanding of the disclosure, the disclosure is not limited to the above-described embodiments, and various modifications and variations are possible from this description by those of ordinary skill in the field to which the disclosure pertains.

Therefore, the spirit of the disclosure should not be limited to the described embodiments, and the scope of the patent claims described below as well as all modifications that are equivalent or equivalent to the scope of this patent claim may fall within the scope of the spirit of the disclosure.

The disclosure may be applied to a display device and an electronic device including the display device. For example, the disclosure may be applied to a digital TV, a 3D TV, a mobile phone, a smart phone, a tablet computer, a VR device, a PC, a home electronic device, a notebook computer, a PDA, a PMP, a digital camera, a music player, a portable game console, a navigation system, and the like.

Although described with reference to the above embodiments, it will be understood that those skilled in the art can variously modify and change the disclosure without departing from the spirit and scope of the disclosure described in the claims below, and their equivalents.

What is claimed is:

1. A display device for vehicle, comprising:

a display panel including a display area including a first pixel and a second pixel, wherein each of the first pixel and the second pixel includes a light blocking layer arranged differently around a light-emitting unit; and a display panel driver configured to drive the display panel, wherein the display panel driver is configured to determine line of sight angles between each of blocks of the display area and a line of sight of a driver based on driver information, and to determine a light emission ratio of the first pixel in each of the blocks and a light emission ratio of the second pixel in each of the blocks based on the line of sight angles for the blocks.

2. The display device for vehicle according to claim 1, wherein the light blocking layer is arranged around the light emitting unit of the second pixel to have a line of sight angle narrower than that of the first pixel, and wherein the driver information includes at least one of a position of an eye of the driver, a position of a driver's seat, an angle of a side mirror, or an angle of a rearview mirror.

3. The display device for vehicle according to claim 1, wherein the light emission ratio of the first pixel of one of the blocks is configured to decrease as the line of sight angle between the one of the blocks and the line of sight of the driver increases.

4. The display device for vehicle according to claim 1, wherein the light emission ratio of the first pixel and the light emission ratio of the second pixel are configured to gradually change at a boundary portion of adjacent blocks among the blocks.

5. The display device for vehicle according to claim 1, further comprising:

a memory device configured to store a light emission ratio lookup table including the light emission ratio of the first pixel according to the line of sight angle and the light emission ratio of the second pixel according to the line of sight angle, wherein the light emission ratio of the first pixel and the light emission ratio of the second pixel are determined using the light emission ratio lookup table.

6. The display device for vehicle according to claim 5, wherein the display panel driver is configured to determine an entire luminance ratio according to the line of sight angle based on the light emission ratio lookup table, a luminance ratio of the first pixel according to the line of sight angle, and a luminance ratio of the second pixel according to the line of sight angle, and to update the light emission ratio lookup table based on the entire luminance ratio according to the line of sight angle.

7. The display device for vehicle according to claim 6, wherein the entire luminance ratio according to the line of sight angle is a value obtained by adding a product of the light emission ratio of the first pixel according to the line of sight angle and the luminance ratio of the first pixel according to the line of sight angle and a product of the light emission ratio of the second pixel according to the line of sight angle and the luminance ratio of the second pixel according to the line of sight angle.

8. The display device for vehicle according to claim 6, wherein the display panel driver is configured to update the light emission ratio lookup table based on the entire luminance ratio according to the line of sight angle being higher than a first reference luminance ratio according to the line of sight angle or lower than a second reference luminance ratio according to the line of sight angle.

9. The display device for vehicle according to claim 5, wherein the display panel driver is configured to update the light emission ratio lookup table based on illuminance information.

10. The display device for vehicle according to claim 9, wherein the display panel driver is configured to update the light emission ratio lookup table by increasing the light emission ratio of the first pixel according to the line of sight angle as an illuminance increases.

11. The display device for vehicle according to claim 9, wherein the display panel driver is configured to update the light emission ratio lookup table by increasing a maximum value or a minimum value of the light emission ratio of the first pixel according to the line of sight angle as an illuminance increases.

12. A method of driving a display device for vehicle including a display area including a first pixel and a second pixel, wherein each of the first pixel and the second pixel includes a light blocking layer arranged differently around a light-emitting unit, the method comprising:

determining line of sight angles between each of blocks of the display area and a line of sight of a driver based on driver information; and determining a light emission ratio of the first pixel in each of the blocks and a light emission ratio of the second pixel in each of the blocks based on the line of sight angles for the blocks.

13. The method according to claim 12, wherein the driver information includes at least one of a position an eye of the driver, a position of a driver's seat, an angle of a side mirror, or an angle of a rearview mirror.

14. The method according to claim 12, wherein the light emission ratio of the first pixel of one of the blocks decreases as the line of sight angle between the one of the blocks and the line of sight of the driver increases.

15. The method according to claim 12, wherein the light emission ratio of the first pixel and the light emission ratio of the second pixel gradually change at a boundary portion of adjacent blocks among the blocks.

16. The method according to claim 12, wherein the light emission ratio of the first pixel and the light emission ratio of the second pixel are determined using a light emission ratio lookup table including the light emission ratio of the first pixel according to the line of sight angle and the light emission ratio of the second pixel according to the line of sight angle, and wherein the method further comprises updating the light emission ratio lookup table.

17. The method according to claim 16, wherein updating the light emission ratio lookup table comprises:

determining an entire luminance ratio according to the line of sight angle based on the light emission ratio lookup table, a luminance ratio of the first pixel according to the line of sight angle, and a luminance ratio of the second pixel according to the line of sight angle; and updating the light emission ratio lookup table based on the entire luminance ratio according to the line of sight angle.

18. The method according to claim 17, wherein the light emission ratio lookup table is updated based on the entire luminance ratio according to the line of sight angle being higher than a first reference luminance ratio according to the line of sight angle or lower than a second reference luminance ratio according to the line of sight angle.

19. The method according to claim 16, wherein updating the light emission ratio lookup table comprises updating the light emission ratio lookup table based on illuminance information.

20. An electronic device comprising:

a processor configured to provide input image data; and a display device configured to display an image based on the input image data, wherein the display device comprises:

a display panel including a display area including a first pixel and a second pixel, wherein each of the first pixel and the second pixel includes a light blocking layer arranged differently around a light-emitting unit; and a display panel driver configured to drive the display panel, and wherein the display panel driver is configured to determine a light emission ratio of the first pixel and a light emission ratio of the second pixel based on a line of sight angle between the display area and a line of sight of a user.

* * * * *